United States Patent
Michel et al.

(10) Patent No.: US 9,661,012 B2
(45) Date of Patent: *May 23, 2017

(54) SYSTEMS AND METHODS FOR IDENTIFYING INFORMATION RELATED TO PAYMENT CARD BREACHES

(71) Applicant: PALANTIR TECHNOLOGIES INC., Palo Alto, CA (US)

(72) Inventors: Jean-Baptiste Michel, Brooklyn, NY (US); Barry McCardel, New York City, NY (US); Daniel Norris, New York City, NY (US); Craig Saperstein, New York City, NY (US); Christopher Glen, Los Angeles, CA (US); Eric Denovitzer, New York City, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,989

(22) Filed: Jul. 8, 2016

(65) Prior Publication Data

US 2017/0026396 A1    Jan. 26, 2017

Related U.S. Application Data

(63) Continuation of application No. 14/923,364, filed on Oct. 26, 2015, now Pat. No. 9,392,008.
(Continued)

(51) Int. Cl.
*H04L 29/06* (2006.01)
*G06Q 20/38* (2012.01)

(52) U.S. Cl.
CPC ....... *H04L 63/1425* (2013.01); *G06Q 20/382* (2013.01)

(58) Field of Classification Search
CPC ............... H04L 63/1425; G06Q 20/382
See application file for complete search history.

(56) References Cited

U.S. PATENT DOCUMENTS

| | | |
|---|---|---|
| 5,632,009 A | 5/1997 | Rao et al. |
| 5,819,226 A | 10/1998 | Gopinathan et al. |

(Continued)

FOREIGN PATENT DOCUMENTS

| | | |
|---|---|---|
| AU | 2014250678 | 2/2016 |
| CN | 102546446 | 7/2012 |

(Continued)

OTHER PUBLICATIONS

Extended European Search Report dated Sep. 22, 2016, issued in related European Application No. EP16180436.4 (9 pages).
(Continued)

*Primary Examiner* — Darren B Schwartz
(74) *Attorney, Agent, or Firm* — Finnegan, Henderson, Farabow, Garrett & Dunner, LLP

(57) ABSTRACT

Approaches for determining a potential merchant breach are described. A system can acquire card transaction data from one or more sources such as merchants or financial institutions, in some instances at a predetermined time interval. Cards associated with the card transaction data can be analyzed to determine the health of a particular card, including the likelihood that the particular card has been compromised. A set of cards are accumulated, and their associated health data is stored. Based on the information obtained from a source, and the health associated with a set of cards, a potential date where a merchant was breached can be determined and fraudulent purchases can be prevented.

17 Claims, 8 Drawing Sheets

Related U.S. Application Data

(60) Provisional application No. 62/196,192, filed on Jul. 23, 2015.

(56) References Cited

U.S. PATENT DOCUMENTS

| | | | |
|---|---|---|---|
| 5,826,021 | A | 10/1998 | Mastors et al. |
| 5,832,218 | A | 11/1998 | Gibbs et al. |
| 5,878,434 | A | 3/1999 | Draper et al. |
| 5,892,900 | A | 4/1999 | Ginter et al. |
| 5,897,636 | A | 4/1999 | Kaeser |
| 5,966,706 | A | 10/1999 | Biliris et al. |
| 6,006,242 | A | 12/1999 | Poole et al. |
| 6,057,757 | A | 5/2000 | Arrowsmith et al. |
| 6,094,643 | A | 7/2000 | Anderson et al. |
| 6,134,582 | A | 10/2000 | Kennedy |
| 6,243,717 | B1 | 6/2001 | Gordon et al. |
| 6,330,546 | B1* | 12/2001 | Gopinathan .......... G06Q 20/00 705/35 |
| 6,430,305 | B1 | 8/2002 | Decker |
| 6,456,997 | B1 | 9/2002 | Shukla |
| 6,463,404 | B1 | 10/2002 | Appleby |
| 6,519,627 | B1 | 2/2003 | Dan et al. |
| 6,523,019 | B1 | 2/2003 | Borthwick |
| 6,594,672 | B1 | 7/2003 | Lampson et al. |
| 6,820,135 | B1 | 11/2004 | Dingman |
| 6,978,419 | B1 | 12/2005 | Kantrowitz |
| 6,980,984 | B1 | 12/2005 | Huffman et al. |
| 7,058,648 | B1 | 6/2006 | Lightfoot et al. |
| 7,168,039 | B2 | 1/2007 | Bertram |
| 7,403,942 | B1 | 7/2008 | Bayliss |
| 7,451,397 | B2 | 11/2008 | Weber et al. |
| 7,461,158 | B2 | 12/2008 | Rider et al. |
| 7,617,232 | B2 | 11/2009 | Gabbert et al. |
| 7,627,489 | B2 | 12/2009 | Schaeffer et al. |
| 7,657,482 | B1* | 2/2010 | Shirey .................. G06Q 20/04 705/38 |
| 7,756,843 | B1 | 7/2010 | Palmer |
| 7,757,220 | B2 | 7/2010 | Griffith et al. |
| 7,899,796 | B1 | 3/2011 | Borthwick et al. |
| 7,912,842 | B1 | 3/2011 | Bayliss |
| 7,917,376 | B2 | 3/2011 | Bellin et al. |
| 7,941,321 | B2 | 5/2011 | Greenstein et al. |
| 7,962,495 | B2 | 6/2011 | Jain et al. |
| 7,971,150 | B2 | 6/2011 | Raskutti et al. |
| 8,036,971 | B2 | 10/2011 | Aymeloglu et al. |
| 8,046,283 | B2 | 10/2011 | Burns |
| 8,054,756 | B2 | 11/2011 | Chand et al. |
| 8,117,022 | B2 | 2/2012 | Linker |
| 8,126,848 | B2 | 2/2012 | Wagner |
| 8,196,184 | B2 | 6/2012 | Amirov et al. |
| 8,214,490 | B1 | 7/2012 | Vos et al. |
| 8,229,902 | B2 | 7/2012 | Vishniac et al. |
| 8,290,838 | B1 | 10/2012 | Thakur et al. |
| 8,290,926 | B2 | 10/2012 | Ozzie et al. |
| 8,302,855 | B2 | 11/2012 | Ma et al. |
| 8,364,642 | B1 | 1/2013 | Garrod |
| 8,429,527 | B1 | 4/2013 | Arbogast |
| 8,473,454 | B2 | 6/2013 | Evanitsky et al. |
| 8,484,115 | B2 | 7/2013 | Aymeloglu et al. |
| 8,554,709 | B2 | 10/2013 | Goodson et al. |
| 8,554,719 | B2 | 10/2013 | McGrew |
| 8,589,273 | B2 | 11/2013 | Creeden et al. |
| 8,595,234 | B2 | 11/2013 | Siripuapu et al. |
| 8,600,872 | B1 | 12/2013 | Yan |
| 8,601,326 | B1 | 12/2013 | Kirn |
| 8,639,552 | B1 | 1/2014 | Chen et al. |
| 8,639,757 | B1 | 1/2014 | Zang et al. |
| 8,666,861 | B2 | 3/2014 | Li et al. |
| 8,676,857 | B1 | 3/2014 | Adams et al. |
| 8,688,573 | B1 | 4/2014 | Ruknoic et al. |
| 8,744,890 | B1 | 6/2014 | Bernier |
| 8,787,939 | B2 | 7/2014 | Papakipos et al. |
| 8,798,354 | B1 | 8/2014 | Bunzel et al. |
| 8,805,737 | B1* | 8/2014 | Chen .................. G06Q 40/00 235/380 |
| 8,812,960 | B1 | 8/2014 | Sun et al. |
| 8,903,717 | B2 | 12/2014 | Elliot |
| 8,924,388 | B2 | 12/2014 | Elliot et al. |
| 8,924,389 | B2 | 12/2014 | Elliot et al. |
| 8,938,686 | B1 | 1/2015 | Erenrich et al. |
| 8,949,164 | B1 | 2/2015 | Mohler |
| 9,032,531 | B1 | 5/2015 | Scorvo et al. |
| 9,069,842 | B2 | 6/2015 | Melby |
| 9,100,428 | B1 | 8/2015 | Visbal |
| 9,105,000 | B1 | 8/2015 | White et al. |
| 9,116,975 | B2 | 8/2015 | Shankar et al. |
| 9,129,219 | B1 | 9/2015 | Robertson et al. |
| 9,146,954 | B1 | 9/2015 | Boe et al. |
| 2001/0027424 | A1 | 10/2001 | Torigoe |
| 2002/0035590 | A1 | 3/2002 | Eibach et al. |
| 2002/0065708 | A1 | 5/2002 | Senay et al. |
| 2002/0095360 | A1 | 7/2002 | Joao |
| 2002/0095658 | A1 | 7/2002 | Shulman |
| 2002/0103705 | A1 | 8/2002 | Brady |
| 2002/0147805 | A1 | 10/2002 | Leshem et al. |
| 2002/0194119 | A1* | 12/2002 | Wright .................. G06Q 20/04 705/38 |
| 2003/0036848 | A1 | 2/2003 | Sheha et al. |
| 2003/0093401 | A1 | 5/2003 | Czahkowski et al. |
| 2003/0105759 | A1 | 6/2003 | Bess et al. |
| 2003/0115481 | A1 | 6/2003 | Baird et al. |
| 2003/0126102 | A1 | 7/2003 | Borthwick |
| 2003/0177112 | A1 | 9/2003 | Gardner |
| 2003/0182313 | A1 | 9/2003 | Federwisch et al. |
| 2003/0212718 | A1 | 11/2003 | Tester |
| 2003/0229848 | A1 | 12/2003 | Arend et al. |
| 2004/0003009 | A1 | 1/2004 | Wilmot |
| 2004/0006523 | A1 | 1/2004 | Coker |
| 2004/0032432 | A1 | 2/2004 | Baynger |
| 2004/0034570 | A1 | 2/2004 | Davis |
| 2004/0083466 | A1 | 4/2004 | Dapp et al. |
| 2004/0111410 | A1 | 6/2004 | Burgoon et al. |
| 2004/0111480 | A1 | 6/2004 | Yue |
| 2004/0117387 | A1 | 6/2004 | Civetta et al. |
| 2004/0153418 | A1 | 8/2004 | Hanweck |
| 2004/0153451 | A1 | 8/2004 | Phillips et al. |
| 2004/0163039 | A1 | 8/2004 | Gorman |
| 2004/0193600 | A1 | 9/2004 | Kaasten et al. |
| 2004/0205524 | A1 | 10/2004 | Richter et al. |
| 2004/0210763 | A1 | 10/2004 | Jonas |
| 2004/0236688 | A1 | 11/2004 | Bozeman |
| 2005/0010472 | A1 | 1/2005 | Quatse et al. |
| 2005/0065811 | A1 | 3/2005 | Chu et al. |
| 2005/0078858 | A1 | 4/2005 | Yao et al. |
| 2005/0086207 | A1 | 4/2005 | Heuer et al. |
| 2005/0097441 | A1 | 5/2005 | Herbach et al. |
| 2005/0131935 | A1 | 6/2005 | O'Leary et al. |
| 2005/0133588 | A1 | 6/2005 | Williams |
| 2005/0149455 | A1 | 7/2005 | Bruesewitz et al. |
| 2005/0154628 | A1 | 7/2005 | Eckart et al. |
| 2005/0154769 | A1 | 7/2005 | Eckart et al. |
| 2005/0262512 | A1 | 11/2005 | Schmidt et al. |
| 2006/0010130 | A1 | 1/2006 | Leff et al. |
| 2006/0026120 | A1 | 2/2006 | Carolan et al. |
| 2006/0074881 | A1 | 4/2006 | Vembu et al. |
| 2006/0080316 | A1 | 4/2006 | Gilmore et al. |
| 2006/0143034 | A1 | 6/2006 | Rothermel |
| 2006/0143075 | A1 | 6/2006 | Carr et al. |
| 2006/0143079 | A1 | 6/2006 | Basak et al. |
| 2006/0149674 | A1* | 7/2006 | Cook .................. G06Q 20/40 705/44 |
| 2006/0184889 | A1 | 8/2006 | Molander |
| 2006/0209085 | A1 | 9/2006 | Wong et al. |
| 2006/0218206 | A1 | 9/2006 | Bourbonnais et al. |
| 2006/0218491 | A1 | 9/2006 | Grossman et al. |
| 2006/0242040 | A1 | 10/2006 | Rader |
| 2006/0253502 | A1 | 11/2006 | Raman et al. |
| 2007/0000999 | A1 | 1/2007 | Kubo et al. |
| 2007/0011304 | A1 | 1/2007 | Error |
| 2007/0038646 | A1 | 2/2007 | Thota |
| 2007/0061259 | A1 | 3/2007 | Zoldi et al. |
| 2007/0067285 | A1 | 3/2007 | Blume |
| 2007/0106582 | A1 | 5/2007 | Baker et al. |
| 2007/0150369 | A1 | 6/2007 | Zivin |

(56) References Cited

U.S. PATENT DOCUMENTS

| | | |
|---|---|---|
| 2007/0150801 A1 | 6/2007 | Chidlovskii et al. |
| 2007/0156673 A1 | 7/2007 | Maga |
| 2007/0178501 A1 | 8/2007 | Rabinowitz et al. |
| 2007/0185867 A1 | 8/2007 | Maga |
| 2007/0192265 A1 | 8/2007 | Chopin et al. |
| 2007/0208736 A1 | 9/2007 | Tanigawa et al. |
| 2007/0233756 A1 | 10/2007 | D'Souza et al. |
| 2007/0239606 A1 | 10/2007 | Eisen |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0016216 A1 | 1/2008 | Worley et al. |
| 2008/0040275 A1 | 2/2008 | Paulsen et al. |
| 2008/0046481 A1 | 2/2008 | Gould et al. |
| 2008/0069081 A1 | 3/2008 | Chand et al. |
| 2008/0103798 A1 | 5/2008 | Domenikos et al. |
| 2008/0103996 A1 | 5/2008 | Forman et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0140576 A1 | 6/2008 | Lewis et al. |
| 2008/0195672 A1 | 8/2008 | Hamel et al. |
| 2008/0222038 A1 | 9/2008 | Eden et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0301042 A1 | 12/2008 | Patzer |
| 2008/0313132 A1 | 12/2008 | Hao et al. |
| 2009/0018996 A1 | 1/2009 | Hunt et al. |
| 2009/0055251 A1 | 2/2009 | Shah et al. |
| 2009/0055487 A1 | 2/2009 | Moraes et al. |
| 2009/0076845 A1 | 3/2009 | Bellin et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0164387 A1 | 6/2009 | Armstrong et al. |
| 2009/0187546 A1 | 7/2009 | Whyte et al. |
| 2009/0187548 A1 | 7/2009 | Ji et al. |
| 2009/0228365 A1 | 9/2009 | Tomchek et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0114817 A1 | 5/2010 | Broeder et al. |
| 2010/0114887 A1 | 5/2010 | Conway et al. |
| 2010/0131502 A1 | 5/2010 | Fordham |
| 2010/0145909 A1 | 6/2010 | Ngo |
| 2010/0161735 A1 | 6/2010 | Sharma |
| 2010/0169192 A1 | 7/2010 | Zoldi et al. |
| 2010/0191563 A1 | 7/2010 | Schlaifer et al. |
| 2010/0204983 A1 | 8/2010 | Chung et al. |
| 2010/0228812 A1 | 9/2010 | Uomini |
| 2010/0235915 A1 | 9/2010 | Memon et al. |
| 2010/0262688 A1 | 10/2010 | Hussain et al. |
| 2010/0306285 A1 | 12/2010 | Shah et al. |
| 2010/0312837 A1 | 12/2010 | Bodapati et al. |
| 2010/0325526 A1 | 12/2010 | Ellis et al. |
| 2011/0004498 A1 | 1/2011 | Readshaw |
| 2011/0004626 A1 | 1/2011 | Naeymi-Rad et al. |
| 2011/0029526 A1 | 2/2011 | Knight et al. |
| 2011/0055074 A1 | 3/2011 | Chen et al. |
| 2011/0061013 A1 | 3/2011 | Bilicki et al. |
| 2011/0066497 A1 | 3/2011 | Gopinath et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0099628 A1 | 4/2011 | Lanxner et al. |
| 2011/0131122 A1 | 6/2011 | Griffin et al. |
| 2011/0131547 A1 | 6/2011 | Elaasar |
| 2011/0153384 A1 | 6/2011 | Horne et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0208565 A1 | 8/2011 | Ross et al. |
| 2011/0208822 A1 | 8/2011 | Rathod |
| 2011/0213655 A1 | 9/2011 | Henkin |
| 2011/0218955 A1 | 9/2011 | Tang |
| 2011/0219321 A1 | 9/2011 | Gonzalez et al. |
| 2011/0225586 A1 | 9/2011 | Bentley et al. |
| 2011/0231305 A1 | 9/2011 | Winters |
| 2011/0252282 A1 | 10/2011 | Meek et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0295649 A1 | 12/2011 | Fine |
| 2011/0307382 A1 | 12/2011 | Siegel et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0036013 A1 | 2/2012 | Neuhaus et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0075324 A1 | 3/2012 | Cardno et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0117082 A1 | 5/2012 | Koperda et al. |
| 2012/0131512 A1 | 5/2012 | Takeuchi et al. |
| 2012/0136804 A1 | 5/2012 | Lucia |
| 2012/0158585 A1 | 6/2012 | Ganti |
| 2012/0159362 A1 | 6/2012 | Brown et al. |
| 2012/0170847 A1 | 7/2012 | Tsukidate |
| 2012/0173381 A1 | 7/2012 | Smith |
| 2012/0191446 A1 | 7/2012 | Binsztok et al. |
| 2012/0197651 A1 | 8/2012 | Robinson et al. |
| 2012/0203708 A1 | 8/2012 | Psota et al. |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0278249 A1 | 11/2012 | Duggal et al. |
| 2012/0296907 A1 | 11/2012 | Long et al. |
| 2012/0323888 A1 | 12/2012 | Osann, Jr. |
| 2013/0006916 A1 | 1/2013 | McBride et al. |
| 2013/0016106 A1 | 1/2013 | Yip et al. |
| 2013/0018795 A1* | 1/2013 | Kolhatkar .......... G06Q 20/4016 705/44 |
| 2013/0046635 A1 | 2/2013 | Grigg et al. |
| 2013/0050217 A1 | 2/2013 | Armitage |
| 2013/0054306 A1 | 2/2013 | Bhalla |

(56) References Cited

U.S. PATENT DOCUMENTS

| | | |
|---|---|---|
| 2013/0057551 A1 | 3/2013 | Ebert et al. |
| 2013/0073454 A1 | 3/2013 | Busch |
| 2013/0096988 A1 | 4/2013 | Grossman et al. |
| 2013/0097130 A1 | 4/2013 | Bingol et al. |
| 2013/0110746 A1 | 5/2013 | Ahn |
| 2013/0110822 A1 | 5/2013 | Ikeda et al. |
| 2013/0117011 A1 | 5/2013 | Ahmed et al. |
| 2013/0124193 A1 | 5/2013 | Holmberg |
| 2013/0132348 A1 | 5/2013 | Garrod |
| 2013/0151148 A1 | 6/2013 | Parundekar et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0226944 A1 | 8/2013 | Baid et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0262328 A1 | 10/2013 | Federgreen |
| 2013/0263019 A1 | 10/2013 | Castellanos et al. |
| 2013/0267207 A1 | 10/2013 | Hao et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0325826 A1 | 12/2013 | Agarwal et al. |
| 2014/0006404 A1 | 1/2014 | McGrew et al. |
| 2014/0012724 A1 | 1/2014 | O'Leary et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0258246 A1 | 9/2014 | Lo Faro et al. |
| 2014/0310266 A1 | 10/2014 | Greenfield |
| 2014/0316911 A1 | 10/2014 | Gross |
| 2014/0344230 A1 | 11/2014 | Krause et al. |
| 2014/0351070 A1 | 11/2014 | Christner et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0046481 A1 | 2/2015 | Elliot |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0134512 A1 | 5/2015 | Mueller |
| 2015/0134666 A1 | 5/2015 | Gattiker et al. |
| 2015/0135256 A1 | 5/2015 | Hoy et al. |
| 2015/0161611 A1 | 6/2015 | Duke et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0188872 A1 | 7/2015 | White |
| 2015/0324868 A1 | 11/2015 | Kaftan et al. |
| 2015/0338233 A1 | 11/2015 | Cervelli et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0034545 A1 | 2/2016 | Shankar et al. |
| 2016/0098173 A1 | 4/2016 | Slawinski et al. |
| 2016/0196615 A1* | 7/2016 | Yen .................. G06Q 40/12 705/30 |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102014213036 | 1/2015 |
| EP | 1672527 | 6/2006 |
| EP | 2487610 | 8/2012 |
| EP | 2778913 | 9/2014 |
| EP | 2778914 | 9/2014 |
| EP | 2858018 | 4/2015 |
| EP | 2863326 | 4/2015 |
| EP | 2869211 | 5/2015 |
| EP | 2884439 | 6/2015 |
| EP | 2884440 | 6/2015 |
| EP | 2889814 | 7/2015 |
| EP | 2892197 | 7/2015 |
| EP | 2963595 | 1/2016 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 02/065353 | 8/2002 |
| WO | WO 2005/116851 | 12/2005 |
| WO | WO 2009/051987 | 4/2009 |
| WO | WO 2010/030919 | 3/2010 |
| WO | WO 2010/098958 | 9/2010 |

OTHER PUBLICATIONS

"A Tour of Pinboard," <http://pinboard.in/tour> as printed May 15, 2014 in 6 pages.

"E-MailRelay," <http://web.archive.org/web/20080821175021/http://emailrelay.sourceforge.net/> Aug. 21, 2008, pp. 2.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Anonymous, "A Real-World Problem of Matching Records," Nov. 2006, <http://grupoweb.upf.es/bd-web/slides/ullman.pdf> pp. 1-16.

(56) References Cited

OTHER PUBLICATIONS

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Delicious, <http://delicious.com/> as printed May 15, 2014 in 1 page.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hua et al., "A Multi-attribute Data Structure with Parallel Bloom Filters for Network Services", HiPC 2006, LNCS 4297, pp. 277-288, 2006.

Jelen, Bill, "Excel 2013 in Depth, Video Enhanced Edition," Jan. 25, 2013.

Johnson, Maggie, "Introduction to YACC and Bison", Jul. 8, 2005.

Johnson, Steve, "Access 2013 on demand," Access 2013 on Demand, May 9, 2013, Que Publishing.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

Mixpanel—Mobile Analytics, <https://mixpanel.com/> Printed Jul. 18, 2013 in 13 pages.

Nadeau et al., "A Survey of Named Entity Recognition and Classification," Jan. 15, 2004, pp. 20.

Nin et al., "On the Use of Semantic Blocking Techniques for Data Cleansing and Integration," 11th International Database Engineering and Applications Symposium, 2007, pp. 9.

Open Web Analytics (OWA), <http://www.openwebanalytics.com/> Printed Jul. 19, 2013 in 5 pages.

Palantir Technolgies, "Palantir Labs—Timeline," Oct. 1, 2010, retrieved from the internet https://www.youtube.com/watch?v=JCgDW5bru9M retrieved on Aug. 19, 2015.

Palmas et al., "An Edge-Bunding Layout for Interactive Parallel Coordinates" 2014 IEEE Pacific Visualization Symposium, pp. 57-64.

Piwik—Free Web Analytics Software. <http://piwik.org/> Printed Jul. 19, 2013 in18 pages.

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Sekine et al., "Definition, Dictionaries and Tagger for Extended Named Entity Hierarchy," May 2004, pp. 1977-1980.

Sigrist, et al., "PROSITE, a Protein Domain Database for Functional Characterization and Annotation," Nucleic Acids Research, 2010, vol. 38, pp. D161-D166.

StatCounter—Free Invisible Web Tracker, Hit Counter and Web Stats, <http://statcounter.com/> Printed Jul. 19, 2013 in 17 pages.

TestFlight—Beta Testing on the Fly, <http://testflightapp.com/> Printed Jul. 18, 2013 in 3 pages.

trak.io, <http://trak.io/> printed Jul. 18, 2013 in 3 pages.

UserMetrix, <http://usermetrix.com/android-analytics> printed Jul. 18, 2013 in 3 pages.

Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Wikipedia, "Federated Database System," Sep. 7, 2013, retrieved from the internet on Jan. 27, 2015 http://en.wikipedia.org/w/index.php?title=Federated_database_system&oldid=571954221.

Wikipedia, "Multimap," Jan. 1, 2013, https://en.wikipedia.org/w/index.php?title=Multimap&oldid=530800748.

Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.

(56) References Cited

OTHER PUBLICATIONS

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Notice of Allowance for U.S. Appl. No. 14/479,863 dated Mar. 31, 2015.
Notice of Allowance for U.S. Appl. No. 14/304,741 dated Apr. 7, 2015.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/504,103 dated May 18, 2015.
Notice of Allowance for U.S. Appl. No. 14/323,935 dated Oct. 1, 2015.
Notice of Allowance for U.S. Appl. No. 14/552,336 dated Nov. 3, 2015.
Notice of Allowance for U.S. Appl. No. 14/326,738 dated Nov. 18, 2015.
Notice of Allowance for U.S. Appl. No. 14/746,671 dated Jan. 21, 2016.
Notice of Allowance for U.S. Appl. No. 13/247,987 dated Mar. 17, 2016.
Notice of Allowance for U.S. Appl. No. 14/923,364 dated May 6, 2016.
Official Communication for U.S. Appl. No. 14/304,741 dated Aug. 6, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 13/827,491 dated Dec. 1, 2014.
Official Communication for U.S. Appl. No. 12/556,307 dated Jun. 9, 2015.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 14/014,313 dated Jun. 18, 2015.
Official Communication for U.S. Appl. No. 14/141,252 dated Oct. 8, 2015.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/304,741 dated Mar. 3, 2015.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.

(56) References Cited

OTHER PUBLICATIONS

Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/516,386 dated Feb. 24, 2016.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/645,304 dated Jan. 25, 2016.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/874,690 dated Dec. 21, 2015.
Official Communication for U.S. Appl. No. 14/923,374 dated Feb. 9, 2016.
Official Communication for U.S. Appl. No. 14/948,009 dated Feb. 25, 2016.
Official Communication for U.S. Appl. No. 15/017,324 dated Apr. 22, 2016.
Official Communciation for Australian Patent Application No. 2014201506 dated Feb. 27, 2015.
Official Communication for Australian Patent Application No. 2014201507 dated Feb. 27, 2015.
Official Communication for Australian Patent Application No. 2014203669 dated May 29, 2015.
European Search Report for European Patent Application No. 09812700.3 dated Apr. 3, 2014.
Extended European Search Report for European Patent Application No. 14158958.0 dated Jun. 3, 2014.
Extended European Search Report for European Patent Application No. 14158977.0 dated Jun. 10, 2014.
Official Communication for European Patent Application No. 14158958.0 dated Apr. 16, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14200246.8 dated May 29, 2015.
Official Communication for European Patent Application No. 14200298.9 dated May 13, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Great Britain Patent Application No. 1411984.6 dated Dec. 22, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for Netherlands Patent Application No. 2013134 dated Apr. 20, 2015.
Official Communication for New Zealand Patent Application No. 622380 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.

* cited by examiner

SYSTEMS AND METHODS FOR IDENTIFYING INFORMATION RELATED TO PAYMENT CARD BREACHES

CROSS REFERENCE TO RELATED APPLICATIONS

This application is a continuation of and claims priority to U.S. patent application Ser. No. 14/923,364, filed Oct. 26, 2015, which claims priority to U.S. Provisional Patent Application No. 62/196,192, which was filed on Jul. 23, 2015. The disclosures of the above-referenced applications are expressly incorporated herein by reference in their entirety.

BACKGROUND

The amount of data being processed and stored is rapidly increasing as technological advances allow users to generate and store increasing amounts of data. Today, large sets of data can be stored in various data structures such as databases. For example, information associated with finger prints and facial recognition systems are stored in large datasets. Similarly, information associated with hospital records, financial records, and legal documents are also stored in large data structures. Moreover, information associated with merchant transactions such as payment card information can be stored.

As data storage became more affordable, large and complex datasets became more ubiquitous. Advances in computing technology similarly helped fuel the growth of what is commonly referred to as Big Data. In addition to the rise of Big Data, during the same period payment card transactions surpassed over 50% of non-cash transactions, as personal checks grew out of favor. Part of this was due to the rising popularity of debit cards which, as opposed to credit cards, allowed money to be transferred directly from a user's account rather than requiring a user to pay a credit card company the money at a later date.

Data breaches involving payment card information has also increased in recent decades. Large data structures used to store payment card information became increasingly popular as merchants were able to monitor user behavior based on payment card information and transaction information involving those payment cards. The sheer amount of information included in these data structures, combined with outdated technology, in some cases, has fueled an increase in payment card breaches. These breaches, whether caused by a hacked card reader, or a hacked data structure, can potentially put information associated with thousands of payment cards into the hands of unauthorized users.

Breaches perpetrated by bad actors such as hackers are increasingly sophisticated. When gaining access to information, these hackers use a variety of techniques to disguise their activities. For instance, a hacker may gain access to a card reader or data structure, and wait for a period of time before using stolen card data. As such, companies that are attacked may not know about the attack for weeks or even months. Further, when an issuing bank or card association discovers a breach, the bank or association may not be able to easily trace the source of a breach. They may notice that many cards are being reported as compromised, but not have a way to determine the date or location of where the card information was stolen. This, in turn, exposes a company, bank, or association to further financial liability because there may be additional compromised cards that have yet to be identified.

Thus, there is a need in the art for a better way to determine the date and location of potential breaches. By determining when and where a breach occurred, a company, an issuing bank, or a card association may be able to identify potentially compromised cards and notify the cards' holders or deactivate the cards. This determination, however, can be difficult because the amount of data required is very large. Previously, many cards would need to be reported as compromised before a company, bank, or association could determine any information related to a breach, and a bank or financial institution would have to piece together circumstantial evidence of a potential breach by cross-referencing transaction data. This process was time consuming and often did not reliably indicate when or where a breach had occurred. As such, because data associated with millions of card transactions does not avail itself to trend determination with ease, new systems are currently being developed to identify breaches in very little time.

BRIEF DESCRIPTION OF THE DRAWINGS

Reference will now be made to the accompanying drawings, which illustrate exemplary embodiments of the present disclosure and in which.

DETAILED DESCRIPTION OF EXEMPLARY EMBODIMENTS

Figure 1:
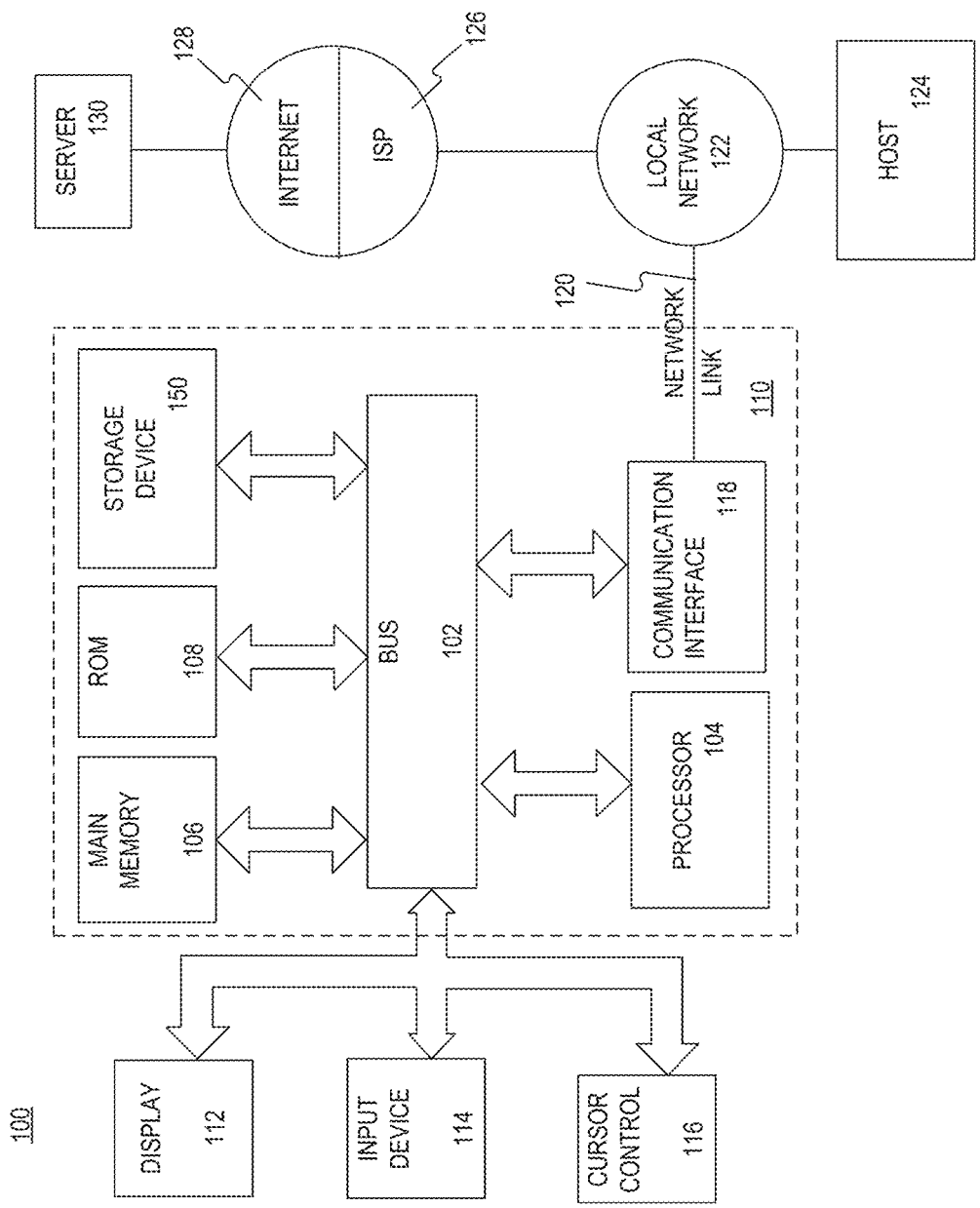
FIG. 1 is a diagram that illustrates an exemplary system used for payment card transactions, consistent with embodiments of the present disclosure.

Reference will now be made in detail to exemplary embodiments, the examples of which are illustrated in the accompanying drawings. Whenever possible, the same reference numbers will be used throughout the drawings to refer to the same or like parts. Herein, the terms cards, payment cards, credit cards, debit cards, and the like may be used interchangeably. Similarly, the terms card health, card health scores, card health values, health values, and the like can be used interchangeably, and generally refer to a score indicating the likelihood that a card was compromised.

Embodiments of the invention described herein generally relate to determining whether a merchant's payment system has experienced a security breach, to determine the likelihood of whether information included in a merchant's system (e.g., information associated with consumers' payment cards or accounts) has been obtained by an unauthorized user. Some embodiments described herein discuss determining whether an information storage system (e.g., a merchant's payment system) has experienced a security breach, to determine whether information included the system (e.g., information associated with consumers' payment cards or accounts) may have been obtained by an unauthorized user. In various embodiments, patterns (which can be displayed as graphs) can be used to determine whether a merchant was breached.

Often, system breaches are not apparent until a banking institution determines from a consumer that a breach has occurred. Banks or other institutions may review fraudulent activities across multiple consumer payment card accounts and multiple transactions that may reveal a common point of payment card usage, which may correspond with the entity whose system was the target of a security breach. Such analysis can take significant amounts of time and involve a rearward-looking focus to identify breaches—often well after they have occurred.

The systems described herein involve a forward-looking monitoring solution that can potentially identify breaches earlier than current techniques. The system may involve determining payment card transaction data and monitoring common points of usage as well as monitoring ongoing payment card health.

In embodiments described herein, breaches may be detected earlier than in traditional manners. For instance, whereas a card issuer or other entity typically discovers a breach when a particular number of cards are cancelled by users that realized their cards have been breached, systems and methods described herein consider and process a variety of information (e.g., whether a card has been declined), at least in part, to determine whether cards have been breached. In the past, typically a consumer called a bank to cancel the card, and the bank used an investigator to determine where the breach occurred. While embodiments described herein may implement such techniques, various embodiments described herein may maintain a database (or other type of data storage) that processes and/or stores which cards were used where and when. Later, if one or more cards are marked (also referred to herein as flagged) with a signal of interest, such as a card being declined, the database may be searched for other cards that may have a similar signal of interest, were used at a common place of purchase, and/or at a particular time period.

Systems and methods described herein may determine a potential breach much sooner than if a card issuer waited for a consumer to notify it of an issue with a card (or to provide another indicator of a potential breach). Because embodiments described herein may focus more on a high volume of low probability indicators of breaches (e.g., declines) as opposed to a low volume of high probability indicators (e.g., customers calling to cancel their cards), false positives and negatives are easier to identify, especially when viewed on a graph. Moreover, embodiments described herein are able to calculate a time of a breach with greater precision. As an example, when a few callers that notify a card issuer of a problem, the card issuer may not be able to pinpoint the time or extent of the breach easily. Due to the high volume of transactions analyzed in embodiments described herein, the time and extent of a potential breach may be determined sooner and with greater accuracy. In addition, because some embodiments described herein are able to recognize a breach prior to any consumer calling to report fraudulent activity (e.g., if the embodiments described herein identify a strange pattern in card usage), breaches may be discovered much sooner than if companies, card issuers, or card associations were to wait for consumers to notify them of a potential breach.

To provide these advantages, the presently disclosed system may make use of any sources of information suitable for enabling a determination of one or more security breaches. For example, sources of information can include, but are not limited to: financial institutions, card associations, merchants, card testing sites, web and/or underground markets for stolen card information, etc. In some embodiments, data associated with transactions occurring at particular merchants may be used to determine security breaches. Some merchants may be associated with particular health scores (also referred to as merchant health scores or merchant breach scores). This association may be determined by a financial institution such as a bank, a card association, an insurance company, etc. either automatically or by an analyst. Alternatively, or in addition, in some embodiments card health (e.g., a score indicating the likelihood of a compromised card) associated with payment cards used at various merchants may be used to determine security breaches. Similarly, card health scores can be assigned and/or determined by a financial institution, card association, insurance company, etc. The various sources of information (merchants, banks, associations, etc.) may be compared, and a determination can be made on an ongoing basis as to the likelihood that a breach has occurred at a particular merchant. This determination may be based on a comparison of transactions on a particular date at the particular merchant and a forward-looking aggregation of payment card health scores. The determinations of card health scores, merchant health scores, and/or potentially breached merchants can be provided to a variety of users, including a government agency such as law enforcement, insurance companies, merchants, financial institutions, card associations, etc.

In some of the embodiments, a base line is used to normalize breach scores. That is to say, in order to remove false positives, cards with breach scores associated with them may be compared to a baseline (e.g., average card behavior, comparable merchants such as nearby merchants, etc.). Further, data associated with where a transaction occurred can come from various data sources. For example, insurance data may be scraped to determine where a potential breach occurred. In addition or alternatively, each merchant can be viewed in real time.

Various graphs may be representative of the types of analysis performed by the disclosed systems. As will be described below, graphs comparing the analyzed data may be provided to a user interface to enable an analyst to assess the likelihood of a breach. Alternatively, or additionally, the likelihood of a breach along with other identifying information associated with the breach may be calculated, and the calculated information could be provided as output to a user interface or to one or more automated tracking systems.

These graphs may be represented as triangle graphs, as shown in the figures. The X-axis may represent transaction date for payment card transactions at a certain entity (e.g., Store X). The vertical axis plots payment card health (e.g., a card status score) as of the particular date on the Y-axis. The amount of card health data available accumulates over time such that more health information is available as time progresses.

Moreover, in various embodiments, approaches described herein can detect breaches associated with personal identifying information (PII). For example, a first set of data including transactions made using PII (e.g., a request for a credit report) and a second set of data including compromised PII (e.g., a set of social security numbers associated with people with compromised PII) can be compared to determine entities that are associated to higher rates of compromised PII. In such an example, which can be determined using the approaches described herein associated with payment cards, an employer may be found to have a larger proportion of employees with compromised PII than other employees.

FIG. 1 is a block diagram of an exemplary computer system 100, consistent with embodiments of the present disclosure. The components of various components described herein, such as environment 300 (of FIG. 3) that includes point of sale (PoS) system 320, third party processor 330, card association 340, issuing bank 350, and/or display 360 may include the architecture based on or similar to that of computer system 100.

As illustrated in FIG. 1, computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or more microprocessors or it can include a reduced instruction set of one or more microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc. is provided and coupled to bus 102 for storing information and instructions.

Computer system 100 can be coupled via bus 102 to a display 112, such as a cathode ray tube (CRT), liquid crystal display, LED display, or touch screen, for displaying information to a computer user. An input device 114, including alphanumeric and other keys, is coupled to bus 102 for communicating information and command selections to processor 104. Another type of user input device may include a cursor control 116, such as a mouse, a trackball, or cursor direction keys for communicating direction information and command selections to processor 104 and for controlling cursor movement on display 112. The input device may have two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 100 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules that can execute on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receives electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 can both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118. The received code can be executed by processor 104 as it is received, and/or stored in storage device 110, or other non-volatile storage for later execution. In some embodiments, server 130 can provide information for being displayed on a display.

Figure 2:
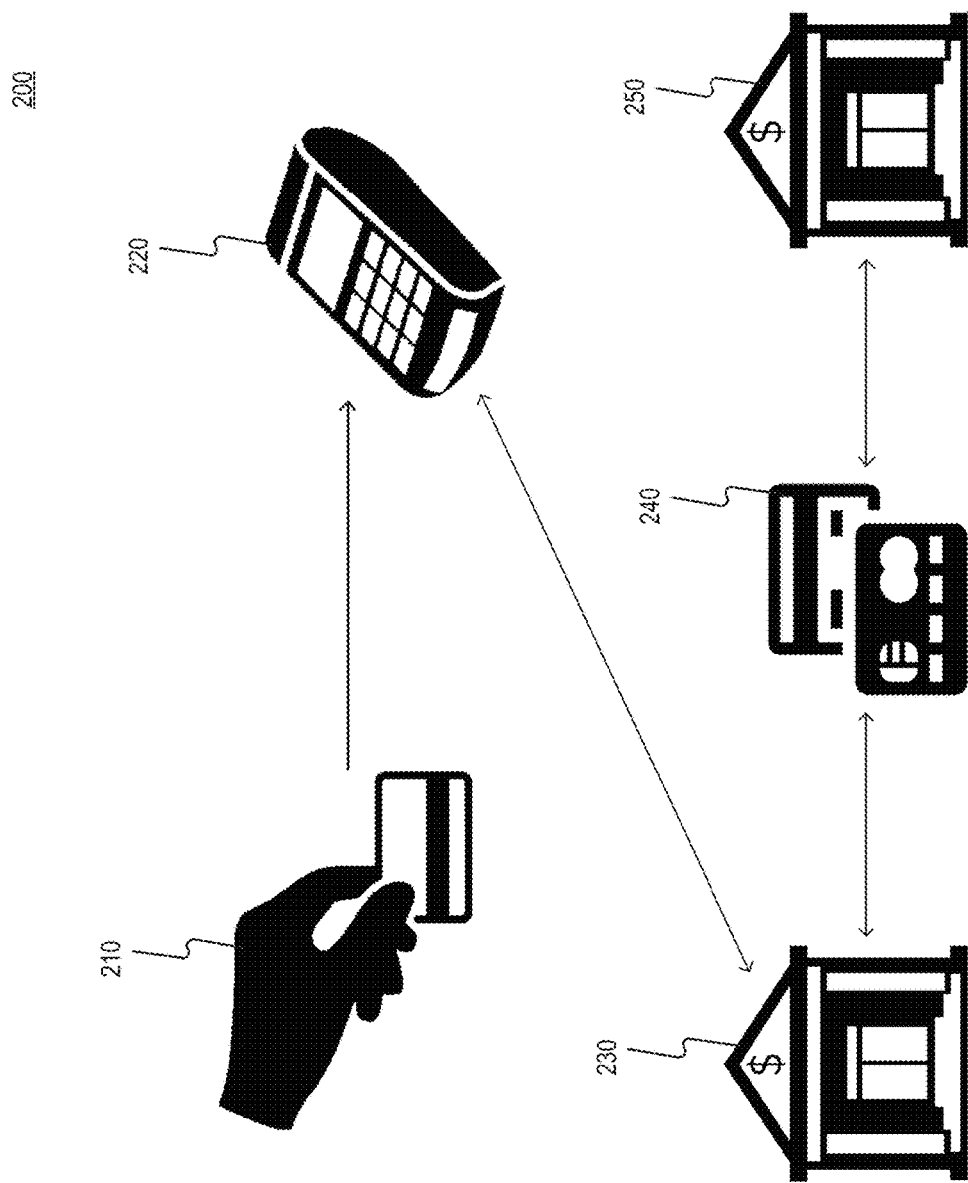
FIG. 2 is a diagram that illustrates an exemplary environment used for payment card transactions, consistent with embodiments of the present disclosure.

FIG. 2 is a diagram that illustrates an exemplary system 200 used for payment card transactions, consistent with embodiments of the present disclosure. System 200 may include a consumer's payment card 210, a Point of Sale (PoS) system 220, a merchant's third party processor 230, a card association 240, and an issuing bank 250.

Typically, authorization begins at when a consumer's payment card 210 is used at a merchant's PoS system 220. This transaction can occur in a variety of locations, such as at the location of a brick-and-mortar store (e.g., at a kiosk or a register), or online (e.g., at an online store or reseller). After a transaction request is entered into a PoS system 220, a merchant's third party processor 230 may parse information gathered from the consumer's payment card 210 (e.g., the digits on the card) and route the transaction request to an appropriate card association 240. Popular card associations 240 include Visa™, MasterCard™, American Express™, Discover™, etc. The card association 240 may process transaction information to route information associated with the transaction request to a consumer's payment card's issuing bank 250. After an issuing bank 250 determines the account status of a card and verifies that an account has an active status (e.g., the account is has not been deactivated and/or has a particular amount of money associated with it), an approval indicator is sent back to the card association 240, then sent to the third party processor 230, and finally sent back to a PoS system 220. If the consumer's card 210 is declined, a decline message is sent back to the PoS system 220 in the same manner. It should be appreciated that there are a variety of different card authorization and settlement systems and processes, and that this describes one such system. Further, it should be appreciated that although terms such as third party processor and issuing bank are used, various other terms known to one skilled in the art could be used. For example, an issuing bank 250 could also be an issuing financial institution, or the like.

Figure 3:
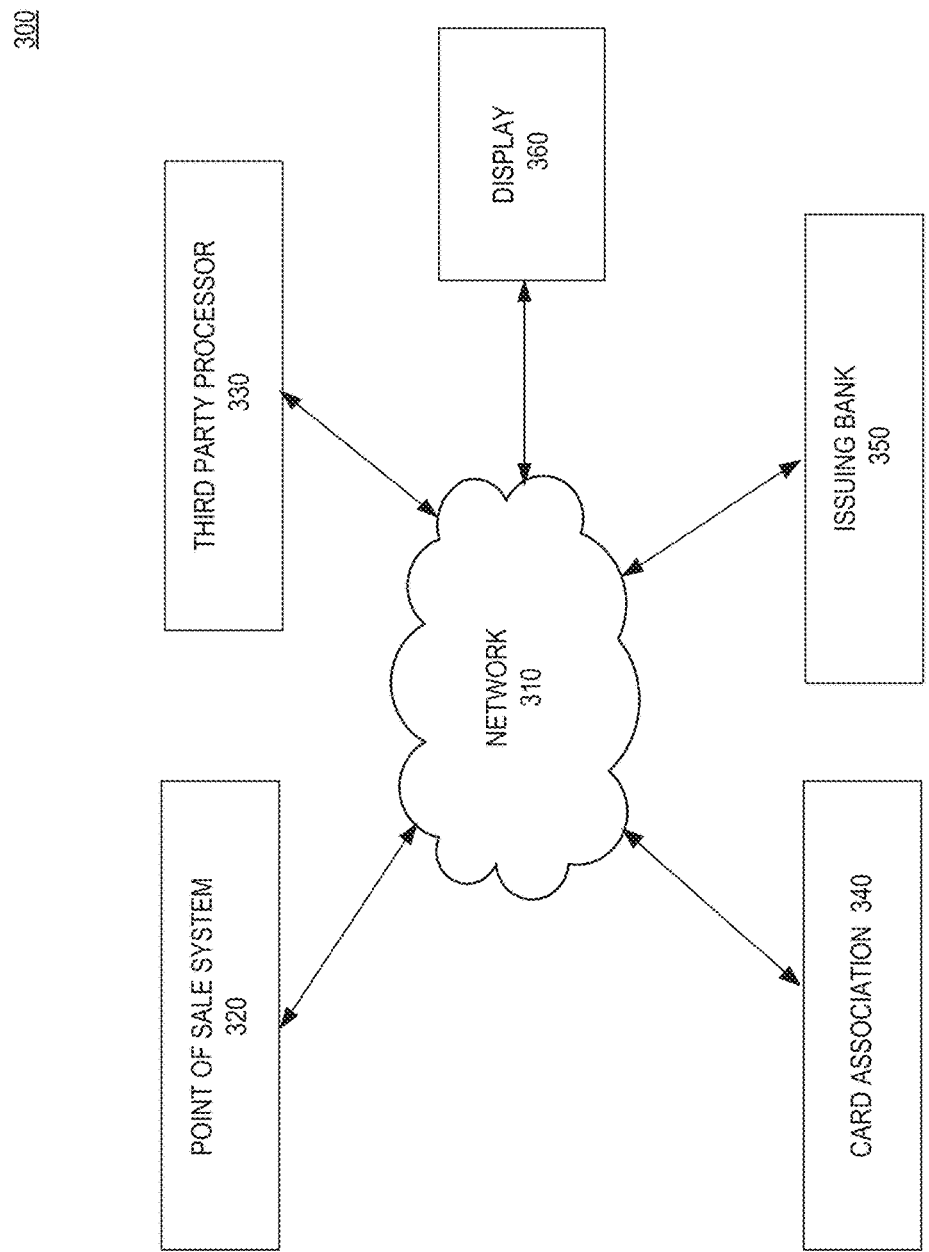
FIG. 3 is a diagram that illustrates an exemplary network environment used for payment card transactions, consistent with embodiments of the present disclosure.

FIG. 3 is a diagram that illustrates an exemplary network environment 300 used for payment card transactions, consistent with embodiments of the present disclosure. Environment 300 includes a network 310, a PoS system 320, a third party processor 330, a card association 340, an issuing bank 350, and a display 360. Similar to system 200, environment 300 illustrates how various portions of a payment card processing system are interconnected. Although not shown in environment 300, additional entities can be communicatively coupled to the entities shown such as an insurance company, a government agency, etc. As shown in environment 300, various portions of a payment card processing system can be located in different locations and coupled together via a network connection, such as over the Internet. In various embodiments, components of environment 300 such as PoS system 320, third party processor 330, card association 340, and issuing bank 350 are electronic devices, which can include at least some of the components described in computer system 100. For example, these components can include a network connection which may include a network interface card, and allows a component to connect to network 310. Components can include one or more processors, such as CPUs, GPUs, and/or DSPs. Further, these components can include memory, displays, I/O devices, etc. In some embodiments, these components can include a single electronic device, or multiple electronic devices such as a cluster of computers. In some embodiments, these components can include a stateless device such as a virtual machine.

With current card payment systems, cards are typically flagged as being compromised after they have been used by an unauthorized user. As discussed above, embodiments described herein attempt to identify compromised cards prior to their use, in large part by identifying whether a card was used at a merchant on a date when a breach is suspected to have occurred.

Typically merchants do not know that they have been breached until the cards are used at various stores, there are recognized indicators of breaches, or they are notified of a suspected breach (e.g., by the card holder or a financial institution). Use of stolen cards is referred to as cashing out. Merchants may become aware that their systems have been breached by a bank notifying them of a number of fraudulent activities occurring by cards that may have been used at a particular merchant's store, and/or within a particular time period. The particular merchant, or their store, is sometimes referred to as a Common Point of Purchase (CPP). Since there is an incentive for merchants not to disclose that their systems have been hacked, many merchants (and/or financial institutions) would rather know that cards have been compromised before they are cashed out. Of course, in some scenarios merchants may have an incentive to publicize a hack (e.g., due to particular laws), in which case they certainly want to learn of the hack before cards are cashed out.

In some embodiments described herein, by determining whether a card is compromised prior to it being cashed out, the card can be deactivated or otherwise change its status to prevent cashing out. As described above, pre-emptively determining whether a card was potentially compromised can be difficult. However, patterns (or trends) indicative of a compromised card can be determined. For example, as described above, information of fraudulent activity may include a card being declined (e.g., when a bad actor attempts to use it). As another example, information indicative of fraudulent activity may include a card being used at a particular number of merchants within a particular amount of time (e.g., 5 or more merchants within twenty minutes) may be indicative of a compromised card. Another example of information indicative of fraudulent activity may include a card being used at a variety of unrelated merchants (unrelated by geography, type of merchant, goods the merchants sell, etc.) within a particular period of time. For instance, a card may be used at a pizza store, a shoes store and an online auto-part store within a particular period of time. Or, as another example, a card may be used at restaurant in California and a store that sells snowboards in Colorado within 5 or 10 minutes of each other.

If a particular merchant is identified as being the source of a breach, then all cards used at that merchant can have their status changed as potentially being compromised. In some embodiments, a date or set of dates can be determined, such that only cards used on that date or within those set of dates have their status changed. Moreover, in some embodiments, methods and systems can be implemented that allow an insurance company to modify information it associates with a particular merchant. For example, if an insurance company receives data indicating that a particular merchant is the source of a breach, the insurance company may determine that the particular merchant's insurance should be adjusted. As another example, a whole class of retailers may have their insurance adjusted (e.g., retailers that do not use particular breach detection measurers, such as those described in the embodiments herein). Further, in some embodiments, an insurance company may adjust rates associated with particular merchants in a particular area based on the determination of one or more breaches. Similarly, insurance companies may change rates associated with merchants that sell similar goods or services based on the breach. For example, in some embodiments, if an insurance company receives information indicating an ice cream store in Miami, Florida is the source of a card breach, the insurance company may adjust its rates associated with other ice cream stores and/or other companies located near the breached ice cream store. By adjusting rates, insurance companies may be able to diminish the impact of claims they are subject to resulting from credit card breaches.

Of course, not all merchant health/breach scores may be acted upon by insurance companies alone. As described in association with the approaches above, merchants and their relevant statistics can be provided in a dossier (e.g., an amount of cards used at a merchant that change in status, the volume of cards a merchant processes, the time a merchant opens their store, etc.). Systems within a financial institution such as a card issuer and/or a card association, or an analyst working within either, can take actions including, but not limited to: (1) closing the merchant and all cards—such that the merchant can no longer process transactions using some or all cards and/or some or all cards used at the merchant can be reissued; (2) closing the merchant—such that the merchant can no longer process transactions; and (3) take no action—such that the merchant can continue to process cards. As described above, such actions made regarding merchants rather than individual cards can increase the efficiency and efficacy of counteracting fraud by shutting down a particular merchant and/or at least some of the cards used at that merchant.

As briefly discussed above, in some embodiments a card association 340 may be notified if a breach has occurred in addition to/or without notifying a financial institution and/or insurance company. In such an example, a card association 340 can alert merchants, one or more financial institutions (e.g., a card issuer or a merchant's bank), one or more card holders, etc. In some embodiments, a card association 340 will be able to determine the card holders, the potentially breached merchants, the issuing banks, the merchant banks, the insurance companies associated with a merchant and/or bank, etc. Similar to insurance companies, card associations 340 may be able to determine a breach score associated with particular merchants or types of merchants, and adjust their fraud monitoring behaviors accordingly.

Figure 4:
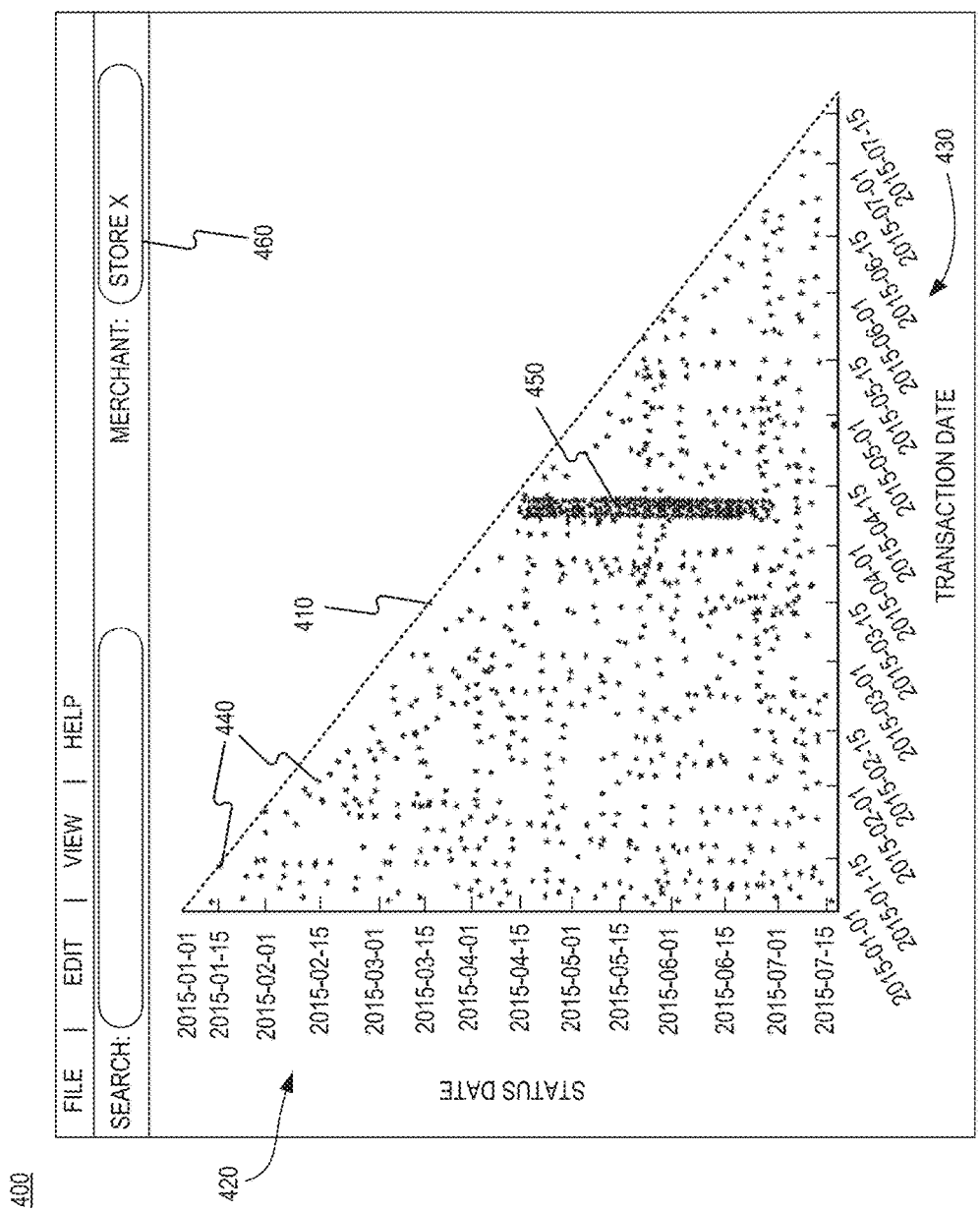
FIGS. 4-7 are illustrations of exemplary interfaces for identifying potential information related to payment card breaches, consistent with embodiments of the present disclosure.

FIG. 4 is an illustration of an exemplary interface 400 for identifying potential information related to payment card breaches, consistent with embodiments of the present disclosure. In some embodiments, interface 400 can be provided on display 360 (as shown in FIG. 3). Display 360 can be coupled with various electronic devices, such as computer system 100 (as shown in FIG. 1), a server, a cloud environment, and/or various other electronic devices. Interface 400 illustrates a graph 410 that can be used to pre-emptively predict card breaches associated with one or more merchants. Graph 410 comprises a Y-axis that indicates a change in the status (or card health) of a payment card on a particular date 430, and the X-axis indicates the transactions that occurred on a particular date 430. In some embodiments, the graph 410 can indicate the health of a cards used in transactions at a particular merchant (e.g., Store X). Interface 400, as well as other interfaces described herein, may indicate the merchant being analyzed using a widget 460 such as a text box or drop-down menu. It should be appreciated that herein, the term merchant can be used interchangeably with a group of merchants, a particular location of a particular merchant, a particular network device/product (e.g., a particular cloud environment, service provider, domain server, etc.), a particular department of a particular merchant, a particular subsidiary of a particular merchant, etc.

Graph 410 also includes a variety of points that indicate a change in the status/health of a payment card (status-change points 440) with reference to the date a transaction was made. In addition, graph 410 includes a period of time where there is a concentration 450 of status-change points 440. Status-change points 440 may indicate payment cards that were declined, were cancelled, flagged as potentially being compromised, deactivated, flagged as suspicious, or another type of change in their card health value, etc. In some embodiments, status-change points 440 can be weighted (and/or included or not included in a graph) based on a variety of attributes associated with a payment card including whether a payment card was deactivated due to a cardholder changing their name, a cardholder reporting fraudulent activity, a cardholder losing their card, etc. In some embodiments, a card's health/status can be re-determined (e.g., the graph can be refreshed), and in turn, a graph or pattern might change.

As illustrated, graph 410 may include transactions that occurred at Store X with a particular set of payment cards. Merchants to analyze may be selected using a menu, search mechanism, or other type of widget 460 in an interface 400. It should be noted that interface 400 can be displayed on a variety of devices, including, but not limited to: mobile electronic devices, smart phones, wearable computers, tablets, devices with touch screens, laptops, desktop computers, etc.

Returning to graph 410, various status-change points 440 are determined based on two dates: the date a transaction occurred, and the date a change in a particular card's health changed. In some embodiments, after a particular merchant is selected, cards used in transactions at that merchant occurring between a set of dates may be determined. If one of those cards experiences a change in its health within the dates shown on the Y-axis of the graph, a dot may be plotted indicating the date of the transaction and the date of the change in card health. For example, a card that was used on Jan. 15, 2015 at a particular merchant may have its health changed on the same day. If so, a status-change point 440 may be plotted on the hypotenuse of the right-triangle illustrated in graph 410. As should be apparent, graph 410 is shaped like a triangle because approaches described herein are not concerned with cards that experienced changes in their health before a particular transaction occurred. Thus, the Y-axis is shown in reverse chronological order as a transaction that occurred on Jul. 15, 2015 (the highest value on the X-axis) could not have a relevant change in health prior to Jul. 15, 2015 (the lowest value on the Y-axis). In some embodiments, more points may be plotted and/or a graph may change its scale as time passes. For example, a card used to make transactions that occurred on Mar. 1, 2015 may not have status-change points 440 associated with the card until April or May 2015, when the card's health changes (note that as time advances, the status-change points 440 associated with a transaction would appear lower on graph 410 since the Y-axis is in reverse chronological order).

As another example shown in graph 410, there is a large concentration 450 of status-change points 440 associated with transactions that occurred shortly before Apr. 15, 2015. This can be indicative of a breach occurring at the transactions date(s) corresponding to this concentration 450. As shown, before Apr. 15, 2015, multiple transactions occurred at Store X with cards that subsequently changed their respective statuses. These changes in status/health occurred between a date after Apr. 1, 2015, until about Jul. 1, 2015. The change in statuses decreased after Jul. 1, 2015—as shown by the decreasing amount of status-change points 440 near the bottom of the concentration 450. This might be because the majority of compromised cards were deactivated or not used as the time following the potential breach increased (e.g., most cards that were compromised in a breach before Apr. 15, 2015 were likely used, deactivated, or otherwise changed their health soon after the breach occurred).

Thus, graphs indicating patterns (e.g., concentrations 450) can be used to determine breaches that may have occurred at a store (e.g., Store X) at an approximate date (e.g., near the beginning of April, 2015 as shown on the X-axis). These patterns can be determined in a variety of ways, such as by a user viewing a display (e.g., display 360), or by a pattern recognition algorithm. It should be appreciated that a pattern recognition algorithm may not require a graph to determine whether a potential breach has occurred, and instead may use other inputs.

Figure 5:
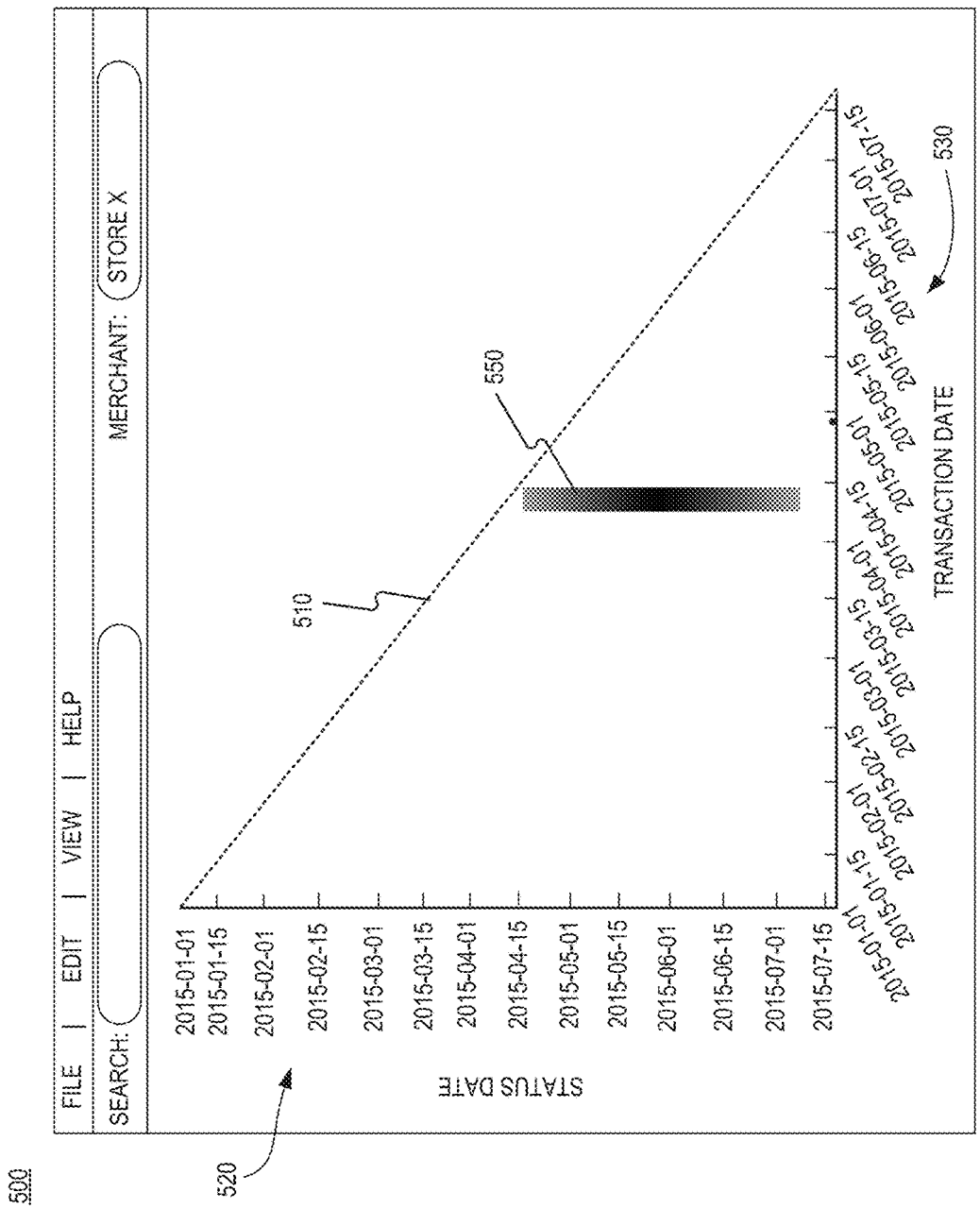

FIG. 5 is a diagram of an exemplary interface 500 for identifying potential information related to payment card breaches, consistent with embodiments of the present disclosure. Interface 500 includes a graph 510 in the shape of a triangle. The Y-axis of graph 510 indicates status dates 520 associated with payment cards and their health values, and the X-axis of graph 510 includes transaction dates 430 associated with payment cards. Similar to graph 410, graph 510 includes a conspicuous band 550 indicating the time, or range of dates, of a potential breach at Store X.

In graph 510, potential breaches appear as a band 550 on the graph between two dates. As described above, various systems and methods can be implemented to identify breaches. For example, in some embodiments a system can recognize that there was a lapse prior to the cards being breached and the cards' status changing. Similarly, systems can use information associated with the number of cards (e.g., as illustrated by the concentration of status-change points in relation to a transaction date in graph 510) that changed statuses to determine that a particular store was where a particular breach occurred. That store may be labelled as a common point of purchase (CPP).

As described above, approaches described herein can be implemented with regard to personal identifying information (PII). PII can be acquired with, or without card transactions. PII can be acquired from a variety of entities that receive, acquire, or request PII. For example, a transaction may include a request for a credit report where a user enters various PII. The PII may include a social security number, an address, a phone number, health information, employer information, information associated with family members, information associated with various payment accounts such as a loan, an online payment service, a phone bill, etc. As additional examples, PII can be acquired from a health care provider, an employer, a bank, etc.

In various embodiments, similar to the card breach detection approaches described herein, a set of known transactions (which, for this approach may be a request for a credit report or accessing health records, etc.), can be compared to a set of known compromised PII. By using an approach similar to those described herein, compromised entities (e.g., an employer or a health care provider) can be flagged as being potentially compromised. For example, if many social security numbers are suspected of being potentially compromised (e.g., acquired in an unauthorized manner), the dates that the social security numbers were found to be potentially compromised can be compared with various entities or transactions (e.g., requests for credit reports or heath records). As with a payment card, it may be possible to determine a potential source of a breach based on the dates various PII was acquired by an entity and the dates on which that PII was flagged as being compromised. It should be understood that the term "flagged" may refer to a change in the status/health of a person, PII, a social security number, a payment card, etc. In some embodiments, set of known transactions and the set of known compromised PII could be stored by the same entity. For example, a credit reporting company could be both the source of transactions which may have been breached and be store a set of known compromised PII (e.g., a set of social security numbers or people/entities associated therewith that may have been compromised). Although much of this application refers to payment card breaches, it should be appreciated that PII breaches can be detected, determined, estimated, etc. in the same methods and by the same systems as described herein with reference to payment card breaches. For example, status-change points could include applications for credit cards, requests for credit reports, requests for identification cards, etc. If a particular amount of applications for credit cards are associated with a particular set of social security numbers (e.g., social security numbers belonging to a particular amount of employees at a particular company), embodiments described herein may notify an employer or other entity that a potential breach of PII has occurred.

Figure 6:
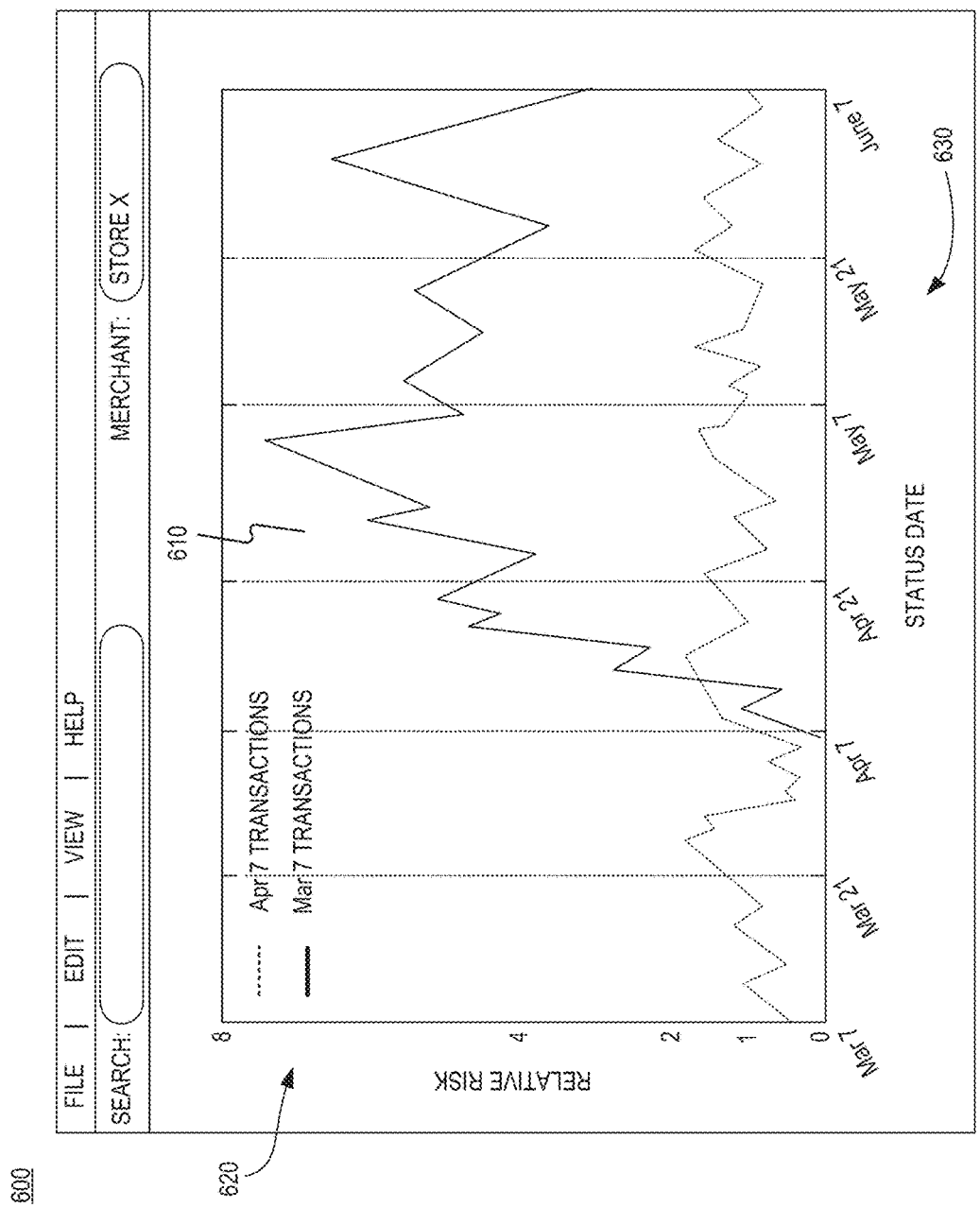

FIG. 6 is another illustration of an exemplary interface 600 for identifying potential information related to payment card breaches, in accordance with embodiments described herein. Graph 610 includes a Y-axis that indicates the relative risk 620 (e.g., probability that a card's associated health will change) associated with the payment cards used in transactions at a particular merchant, and an X-axis that indicates points in time 630 and the relative risk of cards being compromised based on the date that they were used in a transaction. Graph 610 roughly corresponds to graphs 410 and 510. As can be seen, graph 610 indicates card transactions that occurred on April 7 (near early April as in graphs 410 and 510), and the relative risk associated with those cards as time passes. Graph 610 can be useful as a user can compare the relative risk of cards that were used in transactions at Store X on April 7 to the relative risk of cards that were used in transactions at Store X on March 7. As can be seen by an analyst, the relative risk of cards used in transactions on April 7 is much higher than those used in transactions on March 7. Thus, the system can automatically perform risk analysis by predicting in advance the likelihood that a card used in a transaction on a particular date at a particular merchant will be compromised—thus solving the problem with current breach detection systems. As illustrated in graph 610, it is clear that cards used in transactions on April 7 at Store X are much more likely to experience a change in their health score and/or be compromised than cards that were used in transactions at Store X on March 7.

In some embodiments, various types of entities can make use of the disclosed systems. For example, merchants or a card issuing banks can use the systems and methods described herein to determine potential breaches and their potential locations prior to the cards being cashed in. In some embodiments, potential breach locations can be determined by a system, and a list of those locations created by the systems and methods described herein can be provided to one or more users (e.g., merchants or banks). After, a bank can take any of a variety of actions based on the information provided by the systems and methods described herein, such as deactivate all of the cards that were used at a particular location (also referred to as a common point of purchase, or CPP). In some embodiments, a list of cards that were used at potential CPPs can be provided to users, merchants, banks, etc., such that those cards can be deactivated or used for another purpose (e.g., to further detect fraud). In any case, by providing a user with the ability to determine that cards have potentially been compromised, the system can allow a user to prevent the card from being cashed out.

Figure 7:
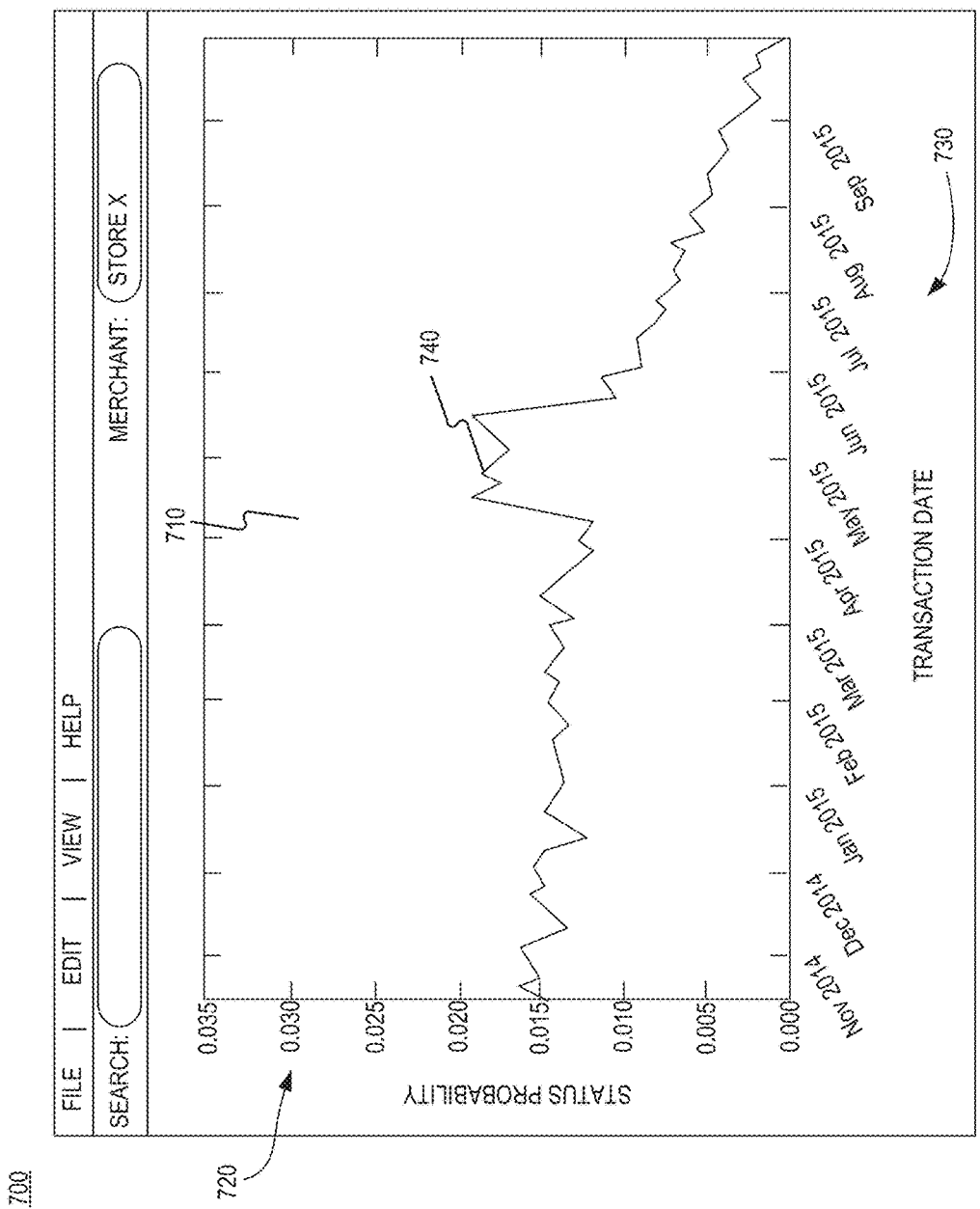

FIG. 7 is another illustration of an exemplary interface 700 for identifying potential information related to payment card breaches. Graph 710 included in interface 700, however, illustrates a line graph including a Y-axis that indicates the probability that a status of one or more cards (interchangeably referred to as the health of one or more cards) has changed or not changed, and an X-axis that indicates the date that a transaction occurred on. Graph 710 also includes an abnormal spike 740 that occurs around April and May of 2015. This spike 740 can be indicative of an increase in sales at a particular merchant. For instance, this spike 740, which indicates a change in the status probability of a set of cards, could be indicative of more shoppers during a particular time of year. Alternatively or additionally, a spike 740 could be indicative of an association, a third party processor, or a card issuing bank changing its system (e.g., a code associated with a merchant) such that a spike 740 indicating a change in status occurs. Abnormalities such as spike 740 may be indicative of false positives (e.g., indications that cards may have been compromised when they were not). False positives can be common, and can be decreased by weighing transactions or attributes of transactions based on the time of year, a geographic location, a change in the systems of a card issuer, etc. Similarly, false positives can be reduced by comparing a set of values or a graph to a baseline, which in the case of graph 710 may indicate that there is always a spike around April and May, often causing false positives.

As described above, transactions may be weighted and/or filtered for significance. For example, if a particular card association, merchant, or issuer bank causes false positives, transactions associated with that association, merchant, or bank may be given less weight than an association or bank that produces more reliable results. Similarly, abnormal amounts of sales during April or May may be given less weight than other days, and thus filtered when a system is attempting to determine potential breaches. Moreover, different weights may be given to different types of cards used in transactions (e.g., cards with microchips in them). In some embodiments, different weights associated with changes in card health can be based on a type of merchant. For example, if a card is being used on a cruise ship, changes in card health that may be associated with using a card in a different country may be filtered or otherwise ignored.

Figure 8:
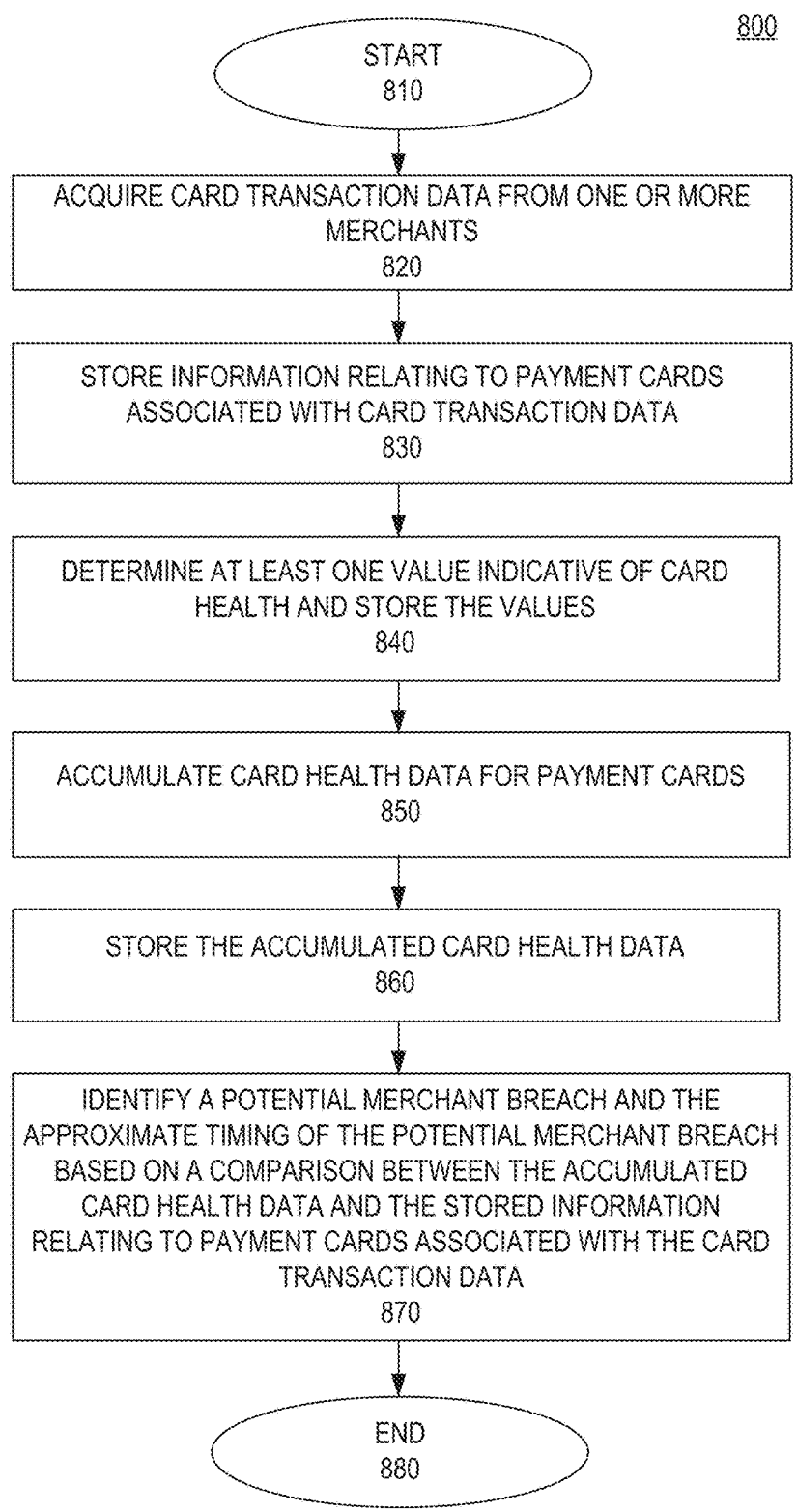
FIG. 8 is a flowchart representing an exemplary method for identifying potential merchant breaches, consistent with embodiments of the present disclosure.

FIG. 8 is a flowchart 800 representing an exemplary method for identifying a potential merchant breach. While the flowchart discloses the following steps in a particular order, at least some of the steps can be performed in a different order, performed in parallel, modified, or deleted where appropriate, consistent with the teachings of the present disclosure. Further, steps may be added to flowchart 800. The method can be performed in full or in part by a system as described in the embodiments discussed above. In addition or alternatively, some or all of these steps can be performed in full or in part by other devices and/or modules.

Flowchart 800 starts at step 810 and at step 820 acquires card transaction data from one or more merchants. In various embodiments, this data can be acquired automatically. The data can be acquired via a data interface, which in some cases allows for the acquisition of card transaction data automatically. It should be understood that card transaction data includes transaction data as discussed throughout the instant disclosure, and vice-versa. In some embodiments, card transaction data acquisition is performed at a particular time interval, which can be predetermined or based on attributes such as the time of year or if an increase in card breaches elsewhere are known to exist. For instance, card transaction data can be acquired once an hour, once a day, once a week, etc. It is further contemplated that card transaction data can be acquired in real time or near-real time, such that a system or method can perform real time or near-real time analysis. Further, card data can be pushed to a system by a merchant, or pulled by a system (e.g., a system may poll merchants for card transaction data). It should be appreciated that systems described herein can gather transaction information associated with billions of transactions from around the world very frequently (e.g., once a day or more). Systems described herein can then use various methods, as described herein, to quickly decipher information associated with transactions, such as whether to weight them or not, and process tens of billions of transactions quickly (e.g., in real- or near-real time). The acquisition of data can occur every day, and when combined with the stored transactional data, patterns or other indications of breach may be determined by such systems. In other words, systems described herein can significantly reduce the amount of computer resources and/or network bandwidth required to process card transactions and determine the probability of a breach, in order to prevent the significant amount of problems caused by not determining a breach until after cards have been cashed out.

At step 830, information related to payment cards associated with the transaction data is stored. This information can be stored in a variety of places, such as within the system before processing, or in a network storage device (e.g., a multi-tenant system such as a cloud). In some embodiments, information can be stored on various virtual or non-virtual devices (e.g., stateless machines), and/or some or all of the processing associated with systems and methods described herein can be performed in on a stateless machine.

At step 840, at least one value indicative of card health is determined and stored for at least some of the payment cards (e.g., the payment cards associated with the card transaction data acquired from the one or more merchants in step 820). This step can also be performed automatically, and occur in real or near-real time. As discussed above, the acquired data can be stored at a system or off-site in some type of network storage device. In some embodiments, the determination of the values indicative of card health is performed at a predetermined time interval (also referred to as a periodic interval, which can include uniform periods or dynamic periods). In some embodiments, card health can be obtained in any suitable manner. In some embodiments, the card health information may be obtained by the card issuing entity, banks, etc. Other services may also be available that can track card health and provide health information. In some embodiments, the approaches described herein used for determining health scores associated with card (or merchants) can be based at least in part upon a card that has been declined. Such a card could assist any of the techniques described herein with determining a common point of purchase (e.g., a breach), or a pattern indicative of a breach and/or card testing more accurately.

At step 850, the card health data for payment cards is accumulated. This can occur over a predetermined period of time (e.g., a day, a month, etc.), and/or can occur automatically. Further, the card health data that is accumulated can be based on the value(s) indicative of card health, as determined in step 840. As described above, card health can include a variety of card attributes (such as whether a card has been declined), and the value of card health can be based at least in part on one or more attributes associated with a card, such as the likelihood that a card has or has not been compromised, whether a card is active or inactive, whether a card has been declined or will be declined, the remaining balance on a card, the spending limit associated with a card and whether that limit has changed (e.g., within the last month), etc. The accumulation of card health data for payment cards can include the card health data for at least some of the cards within a predetermined amount of time (e.g., the last three months or year), or it can be based at least in part on an amount of cards (e.g., 10,000, 100,000, or 10,000,000,000, etc.). In some embodiments the amount of information accumulated can be predetermined by a user, or it can be determined by an amount of storage available. Further, this accumulation can occur in real or near-real time, as with the other steps described herein.

At step 860, the accumulated card health data is stored. This data can then be manipulated to determine patterns, such as those described above. The accumulated data can be stored automatically, and can be replaced the next time data from a merchant is received and card health scores are calculated. In some embodiments, it is contemplated that merchants may provide information associated with card transactions and/or cards where a health score has not been determined. In such a scenario, newly determined health scores can be determined iteratively and added to the accumulation of card health scores in real or near-real time. This can reduce the amount of processing or resources required by a system as only new cards need to have their card health values calculated.

At step 870, a potential merchant breach is identified and an approximate time of the potential merchant breach is determined based on a comparison between accumulated card health data and stored information related to payment cards associated with the acquired card transaction data. For example, as a method or system accumulated card health data for payment cards, it may determine that one or more cards' health scores decreased after a particular time and/or date. This time and/or date can be used to determine the time of a potential breach. In addition, based on the number of cards with decreases in card health values, an estimate can be made as to whether the particular merchant supplying the transaction information was breached, and/or possibly what merchant may have been breached. In some embodiments, departments or sub-PoS systems associated with a merchant can be determined to have been breached.

At step 880 flowchart 800 ends.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system for determining a merchant breach, the system comprising:

a memory device configured to store a set of instructions; and one or more processors configured to execute the set of instructions that cause the one or more processors to:

acquire card transaction data from one or more merchants;

store information relating to payment cards associated with the card transaction data, wherein information identifying cards used at a particular merchant is collected at a particular time interval and stored in a database;

for at least some of the payment cards, determine at least one value indicative of card health and store the determined values for the payment cards;

accumulate card health data for the payment cards based on the determined at least one value indicative of card health;

store the accumulated card health data;

identify a potential merchant breach based on a comparison between the accumulated card health data and the stored information relating to payment cards associated with the card transaction data; and display in a graph of a graphical user interface of the system at least a portion of the accumulated card health data and the card transaction data indicating the potential merchant breach.

2. The system of claim 1, wherein:
the acquisition of the card transaction data is performed at a first predetermined periodic interval; and
the determination of the at least one value indicative of card health is performed at a second predetermined periodic interval.

3. The system of claim 1, wherein the card health is re-determined at least once for each of the payment cards.

4. The system of claim 1, wherein the card health values are stored based on a transaction date.

5. The system of claim 1, wherein a merchant breach is identified by determining the accumulated card health indicator values and identifying a concentration of abnormal card health indicator values within a particular date range.

6. They system of claim 1, wherein the comparison between the accumulated card health data and the stored information includes comparing the times at which card health data of the cards associated with the accumulated card health data changed and one or more common merchants included in the stored information.

7. A method for determining a merchant breach, the method comprising:

acquiring card transaction data from one or more merchants;

storing information relating to payment cards associated with the card transaction data, wherein information identifying cards used at a particular merchant is collected at a particular time interval and stored in a database;

for at least some of the payment cards, determining at least one value indicative of card health and store the determined values for the payment cards;

accumulating card health data for the payment cards based on the determined at least one value indicative of card health;

storing the accumulated card health data;

identifying a potential merchant breach based on a comparison between the accumulated card health data and the stored information relating to payment cards associated with the card transaction data; and displaying in a graph of a graphical user interface of the system at least a portion of the accumulated card health data and the card transaction data indicating the potential merchant breach.

8. The method of claim 7, wherein:
the acquisition of the card transaction data is performed at a first predetermined periodic interval; and
the determination of the at least one value indicative of card health is performed at a second predetermined periodic interval.

9. The method of claim 7, wherein the card health is re-determined at least once for each of the payment cards.

10. The method of claim 7, wherein the card health values are stored based on a transaction date.

11. The method of claim 7, wherein a merchant breach is identified by determining the accumulated card health indicator values and identifying a concentration of abnormal card health indicator values within a particular date range.

12. The method of claim 7, wherein the comparison between the accumulated card health data and the stored information includes comparing the times at which card health data of the cards associated with the accumulated card health data changed and one or more common merchants included in the stored information.

13. A non-transitory computer-readable medium storing a set of instructions that are executable by one or more processors to cause the one or more processors to perform a method to determine a merchant breach, the method comprising:

acquiring card transaction data from one or more merchants;

storing information relating to payment cards associated with the card transaction data, wherein information identifying cards used at a particular merchant is collected at a particular time interval and stored in a database;

for at least some of the payment cards, determining at least one value indicative of card health and store the determined values for the payment cards;

accumulating card health data for the payment cards based on the determined at least one value indicative of card health;

storing the accumulated card health data;

identifying a potential merchant breach based on a comparison between the accumulated card health data and the stored information relating to payment cards associated with the card transaction data; and displaying in a graph of a graphical user interface of the system at least a portion of the accumulated card health data and the card transaction data indicating the potential merchant breach.

14. The method of claim 13, wherein:
the acquisition of the card transaction data is performed at a first predetermined periodic interval; and
the determination of the at least one value indicative of card health is performed at a second predetermined periodic interval.

15. The method of claim 13, wherein the card health is re-determined at least once for each of the payment cards.

16. The method of claim 13, wherein the card health values are stored based on a transaction date.

17. The method of claim 13, wherein the comparison between the accumulated card health data and the stored information includes comparing the times at which card health data of the cards associated with the accumulated card health data changed and one or more common merchants included in the stored information.

\* \* \* \* \*